March 4, 1941.  P. C. ELY ET AL  2,233,734
PIPE JOINT
Filed June 1, 1939
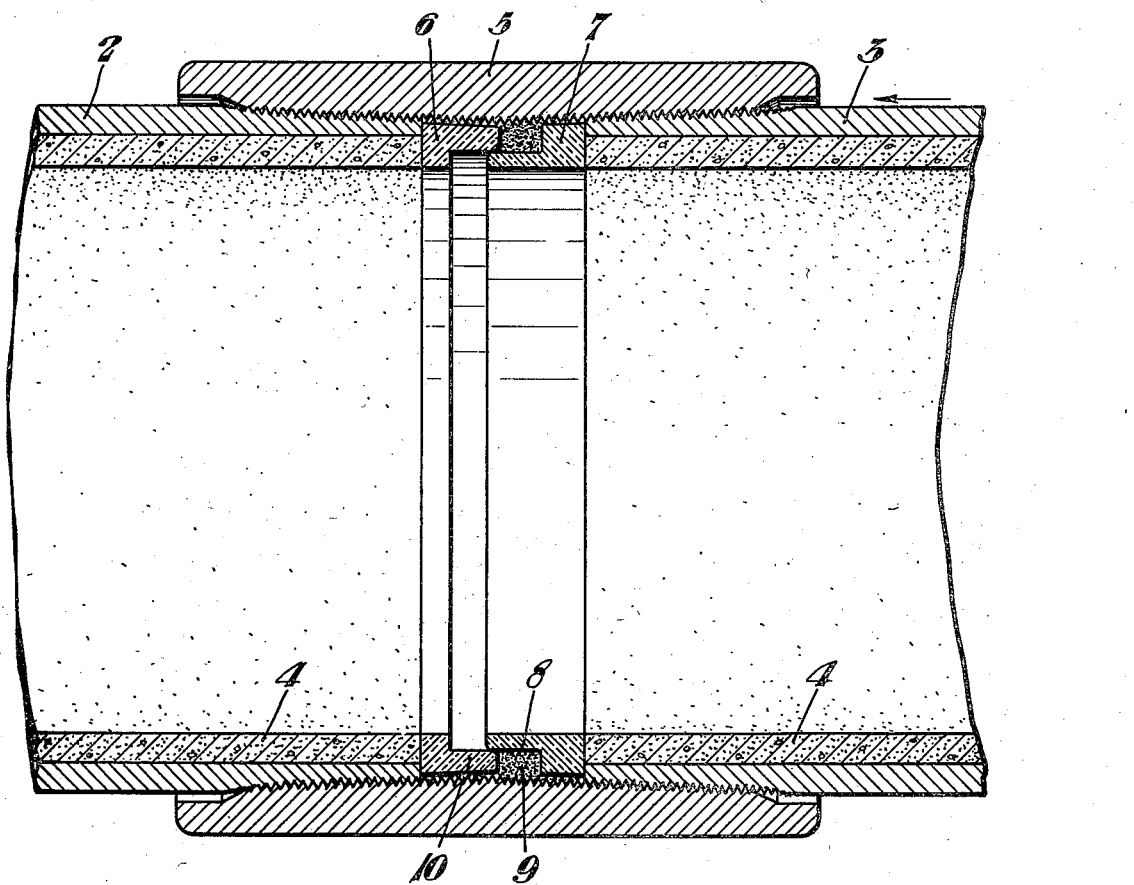
Inventors:
PAUL C. ELY and
JOHN M. HOPKINS.
by: John E. Jackson
Their Attorney.

Patented Mar. 4, 1941

2,233,734

UNITED STATES PATENT OFFICE 2,233,734

PIPE JOINT

Paul C. Ely, and John M. Hopkins, McKeesport, Pa., assignors to National Tube Company, a corporation of New Jersey Application June 1, 1939, Serial No. 276,912

3 Claims. (Cl. 285—148)

This invention relates to pipe joints and, particularly, to an improved pipe joint for cement lined pipes and the like.

Heretofore, it has been difficult to protect the interior surfaces of pipes lined with cement or other suitable substances at the joints thereof against corrosion by the fluid being conveyed thereby. Various designs of joints and means have been suggested and used to protect the joints from such deterioration but most of these have been inefficient and unsatisfactory. In most of the proposed protecting means for such joints, the ends of the pipes and the coupling or connecting member had to be very carefully formed or machined and be held accurately within given close tolerances in order to obtain a fully protected joint which was, of course, inconvenient as well as expensive.

Also, in such proposed pipe joints, it was usually necessary to draw up the joint; that is, tighten the coupling or connecting member on the opposed ends of the pipes until the parts thereof assumed a definite predetermined position relative to each other in order to obtain an effective protective seal of the joint. Thus, it will be seen that the installation of such proposed joints was not only laborious and consumed considerable time and patience, but was very inefficient as well.

In the pipe joint of the present invention, all of these disadvantages have been eliminated; that is, no special attention need be paid to the machining of the pipe ends or coupling, nor to the method of assembling the joint as the parts thereof cooperate automatically to seal the joint to protect the same.

Accordingly, it is one of the objects of the present invention to provide an improved joint for cement lined pipes which is simple and inexpensive in its construction and, yet, one which is very effective in its use.

It is another object of the invention to provide an improved joint for cement lined pipes which can be easily and quickly applied in a minimum amount of time.

It is a further object of the present invention to provide an improved means for joining cement lined pipes which will not only protect the inner metallic walls of the joint from corrosion but also tend to securely seal the joint against leakage.

Various other objects and advantages of this invention will be more apparent in the course of the following specification and will be particularly pointed out in the appended claims.

The drawing shows a longitudinal section through the threaded end portions of pipes 2 and 3 which have a lining 4 of cement or other suitable non-corrosive material with which the present invention is adapted to be incorporated, and there is provided a conventional interiorly threaded coupling member 5 for joining the ends of the pipes 2 and 3 together.

According to the present invention, there is positioned within the coupling between the ends of the pipes 2 and 3, a pair of interlocking or interengaging annular members 6 and 7. These annular members are preferably made of Bakelite or some other suitable non-corrosive material, and have preferably an interior diameter substantially equal to the interior diameter of the cement lined pipes, with the outer diameter thereof preferably being slightly less than the interior diameter of the central portion of the coupling 5. One of the annular members 7 is disposed against the end of one of the cement lined pipes, that is, pipe 3 as shown in the drawing, and secured thereto by means of a viscous cement or other suitable non-corrosive cement. The outer end of the annular member 7 has a much smaller outer diameter than the inner diameter of the coupling 5 so as to provide a space 8 therebetween around the periphery thereof between the annular member 7 and the inner wall of the coupling. There is disposed in this space 8 around the annular member 7 a predetermined quantity of a suitable plastic sealing cement 9. The other annular member 6 is oppositely disposed from the annular member 7 and similarly positioned against the end of the other pipe, that is, pipe 2 as shown in the drawing, and likewise secured thereto by means of a viscous material or other suitable non-corrosive cement. The inner diameter of the outer end of the annular member 6 is slightly larger than the inner diameter of the cement lined pipe and substantially equal to, or preferably slightly more than, the outer diameter of the outer end of the annular member 7 so as to provide a lip portion 10 which is adapted to cooperate with and fit into the space 8 between the annular member 7 and the inner wall of the coupling 5.

The improved joint of our invention as described is preferably assembled in the following manner:

The coupling 5 is preferably first tightly screwed onto the end of one of the pipes to be joined which is preferably done at the point of manufacture of the pipe. The annular member 6 is then positioned within the coupling 5 against the end of the pipe therein and cemented thereto.

The other annular member 7 is cemented to the end of the other pipe and the space 8 therearound is then filled with a predetermined amount of a suitable non-corrosive plastic sealing compound or cement. The end of this pipe together with the annular member 7 on the end thereof is then screwed into the coupling 5. However, in some instances where it might not be desirable to cement the annular members 6 and 7 to the ends of the pipes, especially in a coupling having a tapered inner wall, the annular members are merely placed in the coupling between the ends of the pipes and positioned thereagainst as the ends of the pipes move toward each other when the coupling is being tightened thereon. In any event, as the ends of the pipe are drawn together and tightened by means of the coupling 5, the lip 10 of the annular member 6 is forced into the space 8 between the annular member 7 and the inner wall of the coupling 5, that is, substantially in telescopic engagement with each other, thereby forcing the plastic sealing cement disposed therein therefrom and into any opening or crevice in the joint, thereby completely coating the joint with the non-corrosive cement to protect the same against corrosion and, at the same time, securely sealing the joint against leakage. It will thus be seen that there is provided substantially a continuous inner wall throughout the joint substantially equal to the interior diameter of the cement lined pipes.

In many instances in the manufacture of pipe, the ends thereof are improperly faced or cut, or are not threaded at right angles to the axis of the pipe, or the coupling threads are not concentrically tapped, thus resulting in the faces of the opposed pipe ends not being parallel to each other, and, in many cases, a good joint could not be obtained for this reason. However, in the joint of the present invention, no attention need be paid to these discrepancies as each of the annular members is positioned against its corresponding pipe end and the interlocking arrangement thereof compensates for any tolerances that may have been provided in the manufacture of the threaded pipe ends and the coupling and the resulting uneven faces of the ends of the pipe. Other imperfections in the smoothness of these surfaces are compensated for by application of the plastic sealing cement which completely fills all crevices to form a fluid tight joint.

One of the most important aspects of the present invention is that the proper amount of plastic sealing cement for any given joint may be accurately measured and positioned in the space 8 between the annular member 7 and the inner wall of the coupling 5 and uniformly and properly distributed throughout the joint when the opposed ends of the pipes are joined together and tightened.

While we have shown and described one embodiment of our invention, it will be seen that this embodiment is merely for the purpose of illustration and description and that various other forms may be devised within the scope of our invention, as defined in the appended claims.

We claim:

1. Means for joining lined pipes including, in combination, an interiorly threaded coupling, a pair of inter-engaging annular members of non-corrosive material arranged within said coupling substantially centrally thereof, one of said annular members being positioned against the end of one of said pipes and having a smaller outer diameter than the inner diameter of the coupling so as to provide a space therebetween, the other of said annular members being positioned against the end of the other of said pipes and having an inner diameter slightly larger than the outer diameter of said first mentioned annular member and which is adapted to telescope therewith, and a plastic sealing cement disposed in the space between the annular member and the coupling whereby the same is forced into any openings in the joint when the coupling is screwed onto the ends of the pipes and the same is securely drawn together thereby.

2. Means for joining lined pipes including, in combination, a metallic coupling, a pair of cooperable annular members of non-corrosive materials adapted to be disposed within said coupling with one of them positioned against the opposite ends of the pipes, one of said members having at least a portion thereof of a smaller outer diameter than the inner diameter of the coupling so as to provide a space therebetween, the other of said members having an outer diameter slightly less than the inner diameter of said coupling, a plastic sealing cement adapted to be disposed in the space between the smaller diameter portion of said first mentioned annular member and the inner wall of said coupling, said second mentioned annular member adapted to telescopically engage with the smaller diameter of said second mentioned annular member and to cooperate with the cement arranged therearound in said space to seal the joint when the ends of the pipes are screwed into the coupling and drawn together.

3. A pipe joint for cement lined pipes and the like including, in combination, a threaded coupling for joining together the threaded ends of the pipe, a pair of interengaging annular members of non-corrosive material oppositely arranged within said coupling substantially centrally thereof, said annular members having an outer diameter slightly less than the interior diameter of said coupling and an inner diameter substantially equal to that of the pipes to be joined with the outer end portion of each of said annular members having a wall thickness substantially equal to the wall thickness of the ends of said pipes, each of said annular members having their outer end surfaces cemented to the outer end of one of said pipes with the inner end of one of said annular members having a reduced outer diameter so as to provide a space around the periphery thereof between the same and the inner wall of said coupling, a plastic sealing medium disposed in said space therearound, the inner end of the other of said annular members having an inner diameter slightly larger than the reduced outer diameter of the inner end of the opposed annular member so that the inner end of the last mentioned annular member will fit over the inner end of the first mentioned annular member telescopically engaging therewith whereby the plastic sealing medium arranged in the space around the inner end of the first mentioned annular member is compressed when the pipes are screwed into the coupling and drawn together thereby and forced into any opening in the joint to completely seal the same.

PAUL C. ELY.
JOHN M. HOPKINS.